INVENTOR.
William C. Johnson, Jr.

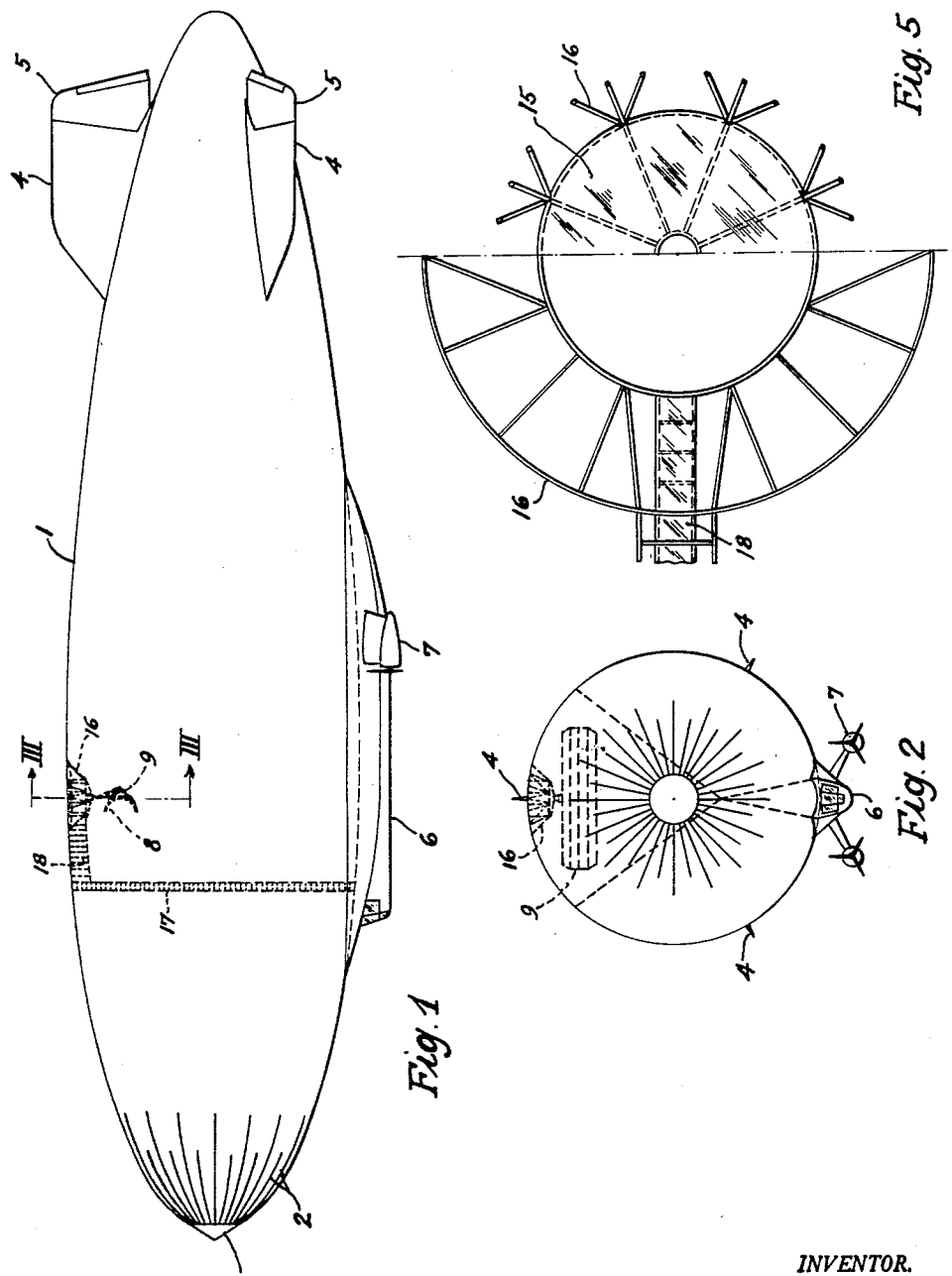

2,929,581

AIRSHIP-ENCLOSED RADAR UNIT

William C. Johnson, Jr., Mantua, Ohio, assignor to Goodyear Aircraft Corporation, Akron, Ohio, a corporation of Delaware Application November 26, 1954, Serial No. 471,169

2 Claims. (Cl. 244—30)

This invention relates to radar units of large size for detecting from high altitudes aircraft and other targets at great distances and in particular to radomes for such units carried by non-rigid airships.

Heretofore it has ben known to arrange in non-rigid airships radar antennas covered by radomes usually made of glass fibre-reinforced plastic material at various locations outside of the lifting gas envelope to send and receive substantially unobstructed electro magnetic radiation. These antennas, used for various purposes, were of relatively small size so that the size of the radomes enclosing them was within reasonable limits. However, when using a long-range search antenna its size reaches enormous dimensions, such as 35 feet and more in width, and, accordingly, a radome for such an antenna involves much weight and air resistance.

It is the general object of the invention to avoid and overcome the foregoing and other difficulties of and objections to prior art practices by the elimination of a separate radome for this long-range radar antenna, with the result of saving weight and reducing air resistance.

The aforesaid objects of the invention, and other objects which will become apparent as the description proceeds, are achieved by using the airship envelope itself as a radome for the long-range radar antenna. This is made possible, because an airship envelope made of gas-tight impregnated fabric will transmit, substantially without loss, electro-magnetic radiation, and further by omitting to the greatest possible extent all metal parts on and within the envelope in the path of such radiation.

For a better understanding of the invention reference should be had to the accompanying drawings, wherein—

Fig. 1 is a side view of a non-rigid airship, including one embodiment of the invention;

Fig. 2 is a front view thereof;

Fig. 5 is a plan view of the antenna supporting structure, one half of which shows the top structure and the other half a cross-sectional view taken on line V—V of Fig. 4.

Figure 3:
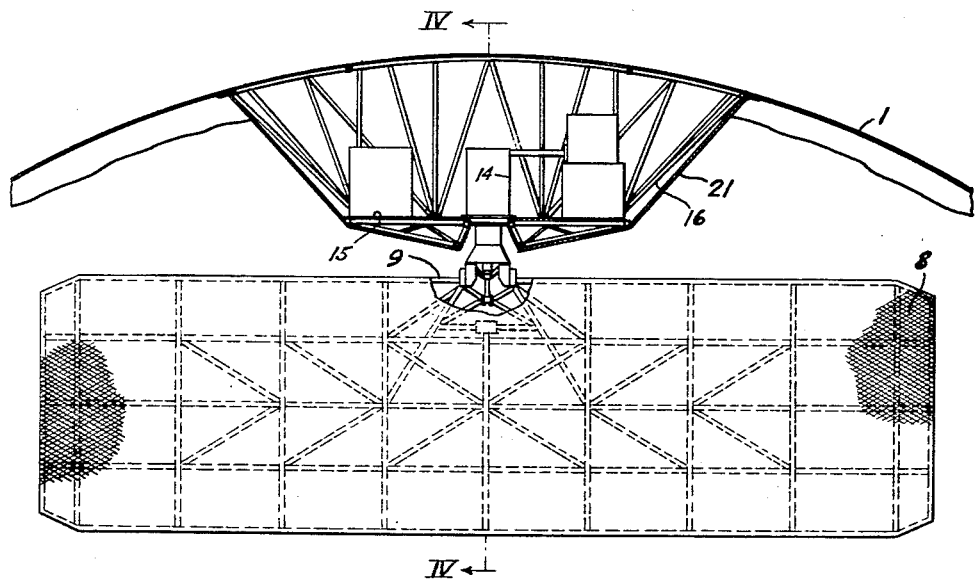
Fig. 3 is a cross-sectional view, taken on line III—III of Fig. 1, showing in larger scale the antenna and support therefor.
Figure 4:
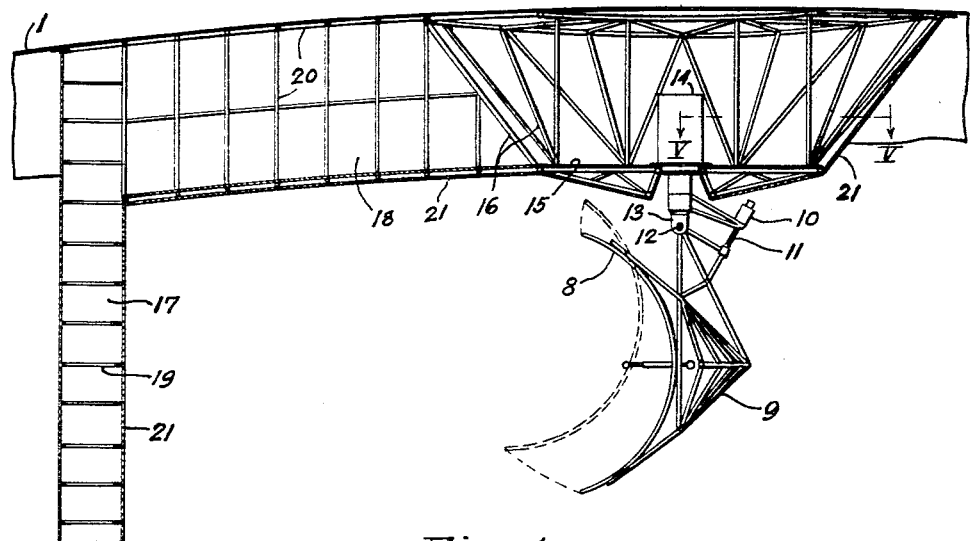
Fig. 4 is a longitudinal cross-sectional view taken on line IV—IV of Fig. 3.

With specific reference to the form of the invention illustrated in the drawings, the numeral 1 indicates the airship envelope made of gas-tight impregnated fabric transmissive for electromagnetic waves. This envelope is provided at the bow with stiffening battens 2 formed preferably of resin-impregnated glass fibre cloth and radiating from a rigid cone 3. At the stern are arranged three stabilizing fins 4, one of which extends vertically and the two others at 120° angles thereto. Each fin carries a control surface 5. Above the control car 6, positioned underneath the envelope 1 and carrying power units 7, is located within the envelope a large long-range antenna including a reflector 8 fixedly attached to a tubular structure 9 tiltable by means of a servo motor 10 and screw 11 about a horizontal pivot 12 inserted in a vertical shaft 13 rotatably mounted in a housing 14 which is supported by the floor 15 of the operating room structure 16 attached to the envelope 1. A vertical access shaft 17 and a short longitudinal gangway 18 attached to the envelope 1 connect the control car 6 with the antenna operating room. The rigid structures 16, 19 and 20 of the operating room, of the vertical shaft 17 and of the gangway 18, respectively, are enclosed by a gas-tight fabric cover 21, which is sealed against the fabric envelope 1 to prevent leakage of lifting gas. The structures 19 of access shaft 17, and 20 of gangway 18, are made of resin-impregnated glass fibre cloth to make them transmissive for electromagnetic waves.

From the aforesaid it will be recognized that the objects of the invention of eliminating a separate radome for a large-size search radar antenna have been achieved by using the airship envelope itself as a radome with the resulting simplification of the construction, weight saving and reduction of air resistance.

While certain representative embodiments and details have been shown for the purpose of illustrating the invention, it will be apparent to those skilled in this art that various changes and modifications may be made therein without departing from the spirit or scope of the invention.

What is claimed:

1. A non-rigid airship comprising a substantially non-metallic lifting gas envelope, a control car mounted underneath the lifting gas envelope, an operating room structure attached to the inside of the upper envelope portion, a gas-tight cover surrounding said structure, and a large long-range radar search antenna operatively controlled from and mounted on and underneath said operating room structure within the lifting gas space of the envelope for movement about a vertical axis and about a horizontal axis, said envelope serving as a radome for the antenna.

2. A non-rigid airship comprising a lifting gas fabric envelope having maximum transmissibility of electromagnetic waves at least distortion, a control car attached to the bottom of the envelope, an operating room structure positioned inside the envelope substantially above the control car, access means between the control car and the operating room structure, gas-tight cover means for said access means and said operating room structure, and a large, long-range, radar search antenna operatively mounted on said operating room structure and located within the lifting gas space of said envelope, said envelope serving as radome for the antenna.

References Cited in the file of this patent

UNITED STATES PATENTS

| | | |
|---|---|---|
| 2,331,404 | Liebert | Oct. 12, 1943 |
| 2,617,934 | McMillan et al. | Nov. 11, 1952 |
| 2,659,884 | McMillan et al. | Nov. 17, 1953 |